UNITED STATES PATENT OFFICE.

THOMAS A. EDISON, OF MENLO PARK, NEW JERSEY.

MANUFACTURE OF INCANDESCENTS.

SPECIFICATION forming part of Letters Patent No. 274,296, dated March 20, 1883.

Application filed August 14, 1882. (No specimens.)

*To all whom it may concern:*

Be it known that I, THOMAS A. EDISON, of Menlo Park, in the county of Middlesex and State of New Jersey, have invented a new and useful Improvement in the Manufacture of Incandescing Conductors for Electric Lamps, (Case No. 456;) and I do hereby declare that the following is a full and exact description of the same.

The object I have in view is to provide a cheap and efficient material and method for producing flexible carbon filaments for use as the incandescing conductors of electric lamps. This I accomplish by the use of gluten, or a mixture thereof with starch or other material. The gluten is obtained by removing the starch from the flour of cereals; but a part or all of the starch may be allowed to remain mixed with the gluten. A dough or paste is formed of the gluten or gluten and starch with the minimum amount of water, and the dough is then pressed out on polished surfaces into sheets of uniform thickness. Filaments of the desired shape with enlarged ends are punched from the dough and are dried, after which they are carbonized by heat under strain and pressure; or the dough is forced by pressure from a chamber through an orifice in the shape of a long filament, and is cut into proper lengths. Extra pieces of dough are put on the ends of the cut filaments to form the enlarged clamping ends, when the filaments are bent into proper shape and dried, after which they are carbonized by heat under strain and pressure. The filaments made in either way described may be dried under strain or strain and pressure to preserve their shape.

What I claim is—

A flexible carbon filament for incandescing electric lamps, formed of carbonized gluten, or a mixture thereof with other materials, substantially as set forth.

This specification signed and witnessed this 5th day of July, 1882.

THOMAS A. EDISON.

Witnesses:
C. P. MOTT,
RICHD. N. DYER.